(12) United States Patent
Lee (10) Patent No.: US 9,354,431 B2
(45) Date of Patent: May 31, 2016

(54) ZOOM LENS

(71) Applicant: CALIN TECHNOLOGY CO., LTD., Taichung City (TW)

(72) Inventor: Ming-Lin Lee, Taoyuan County (TW)

(73) Assignee: CALIN TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 14/320,060

(22) Filed: Jun. 30, 2014

(65) Prior Publication Data

US 2015/0378138 A1    Dec. 31, 2015

(51) Int. Cl.
*G02B 15/177* (2006.01)
*G02B 13/00* (2006.01)
*G02B 15/16* (2006.01)

(52) U.S. Cl.
CPC ............ *G02B 15/177* (2013.01); *G02B 13/009* (2013.01); *G02B 13/0045* (2013.01); *G02B 15/161* (2013.01)

(58) Field of Classification Search
CPC ...... G02B 13/009; G02B 15/14; G02B 15/15; G02B 15/155; G02B 15/16; G02B 15/161; G02B 15/163; G02B 15/177; G02B 15/20; G02B 15/22

USPC ......... 359/676, 677, 680, 681, 682, 683, 691, 359/708–717, 686, 689
See application file for complete search history.

(56) References Cited

U.S. PATENT DOCUMENTS

2008/0049335 A1\* 2/2008 Tomioka ........................ 359/691
2011/0134537 A1\* 6/2011 Muratani ...................... 359/680

\* cited by examiner

*Primary Examiner* — Ricky Mack
*Assistant Examiner* — Gary O'Neill
(74) *Attorney, Agent, or Firm* — Ming Chow; Sinorica, LLC (57) ABSTRACT

A zoom lens includes a negative first lens group, an aperture, and a positive second lens group. The first lens group includes a negative first lens, a negative second lens, and a positive third lens. The second lens group includes a positive fourth lens, a negative fifth lens, a negative sixth lens, and a positive seventh lens, wherein the fifth lens is formed by adhering a positive lens and a negative lens, and the sixth lens is a meniscus lens. The zoom lens can be switched toward a telephoto mode from a wide mode by moving the second lens group from the image side toward the object side.

11 Claims, 8 Drawing Sheets

ZOOM LENS

BACKGROUND OF THE INVENTION

1. Technical Field

The present invention relates generally to optical lens, and more particularly to a zoom lens.

2. Description of Related Art

With the recent development of video recording devices, such as surveillance devices or closed-circuit televisions (CCTV), the market demand of lens modules increases. In consideration of convenience of installation and serviceability, the market prefers miniature and lightweight devices which perform good video quality.

Since this kind of video recording devices shows a tendency of miniature in recent years, the size of lens modules applied therein is greatly reduced too. In addition, optical lenses in these video recording devices have to provide better optical performance to achieve higher resolution and higher contrast. Therefore, miniature, high optical performance, and zooming functionality are essential elements for lenses of video recording devices.

BRIEF SUMMARY OF THE INVENTION

In view of the above, the primary objective of the present invention is to provide a zoom lens which has miniature structures, and effectively enhances optical performance.

The zoom lens provided in the present invention is positioned between an object side and an image side, and includes a negative first lens group, an aperture, and a positive second lens group. The negative first lens group includes a negative first lens, a negative second lens, and a positive third lens which are sequentially arranged from the object side toward the image side. The positive second lens group includes a positive fourth lens, a negative fifth lens, a negative sixth lens, and a positive seventh lens which are sequentially arranged from the object side toward the image side, wherein the fifth lens is formed by adhering a positive lens and a negative lens, and the positive lens is closer to the object side than the negative lens; the sixth lens is a meniscus lens with a convex surface facing the object side and a concave surface facing the image side. The first lens group, the aperture, and the second lens group are sequentially arranged along an optical axis from the object side toward the image side.

Whereby, the zoom lens is switched to a telephoto mode from a wide mode by moving the second lens group, which is located between the aperture and the image side, from the image side toward the object side; when the zoom lens is focusing, the first lens group is moved along the optical axis relative to the aperture. Therefore, not only is the zoom lens miniature, but it also provides high optical performance.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
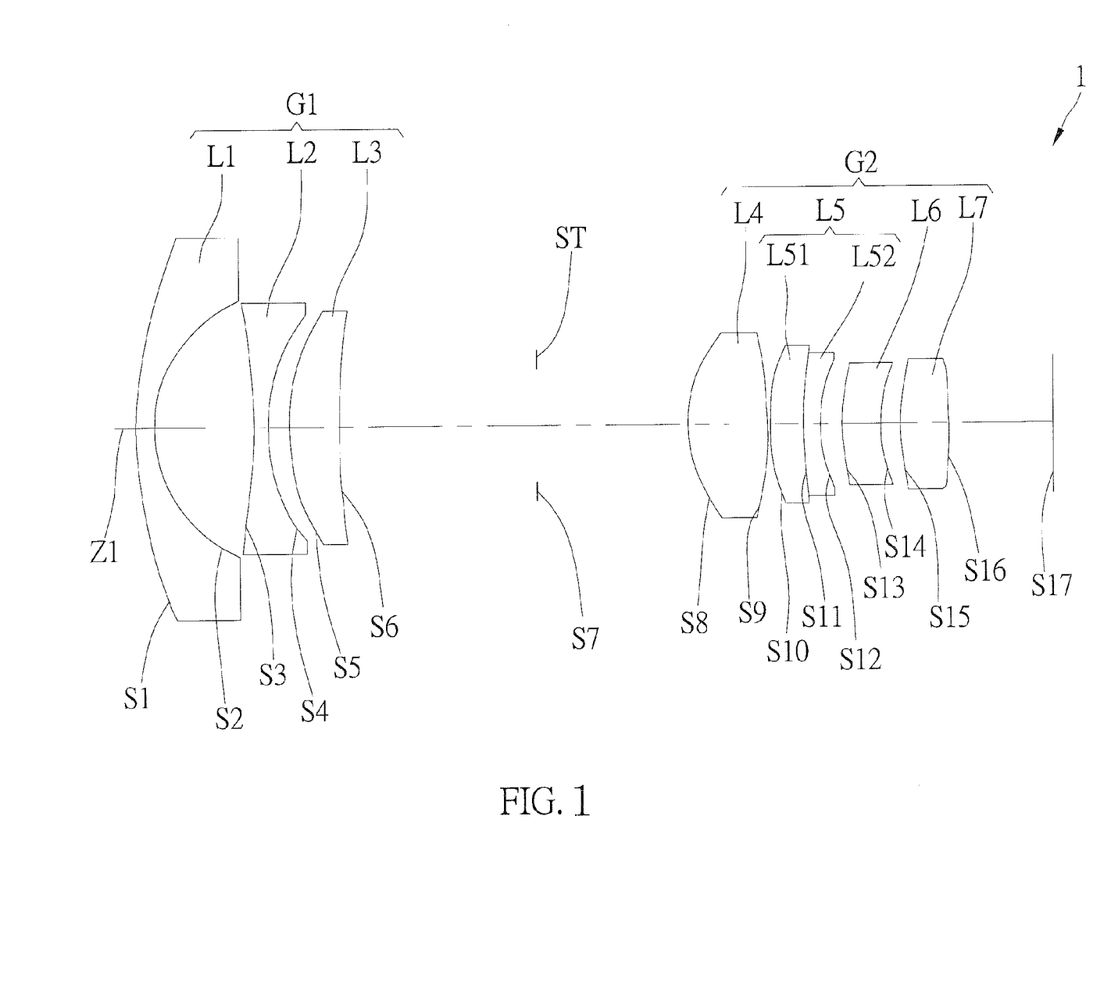
FIG. 1 is a schematic diagram of a first preferred embodiment of the present invention, showing the arrangement of the lenses in wide mode.
Figure 2:
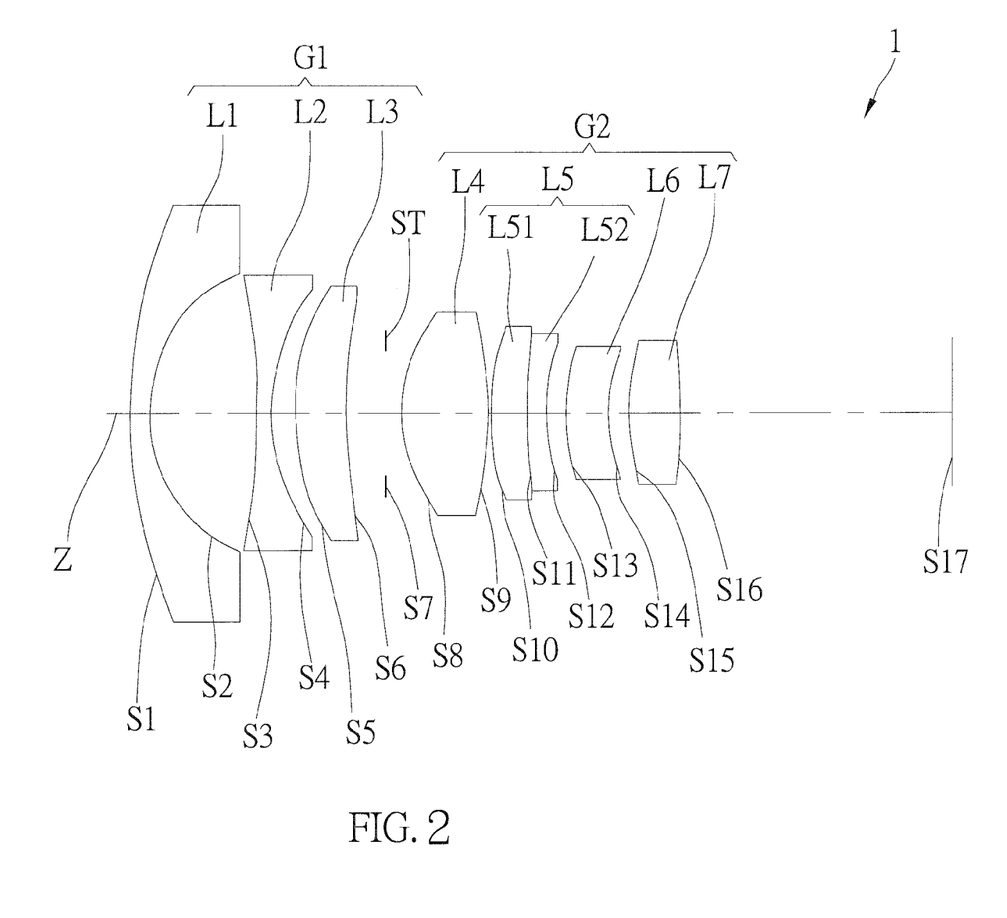
FIG. 2 is a schematic diagram of the first preferred embodiment of the present invention, showing the arrangement of the lenses in telephoto mode.

As shown in FIGS. 1 and 2, a zoom lens 1 of the first preferred embodiment of the present invention includes a negative first lens group G1, a aperture ST, and a positive second lens group G2 which are sequentially arranged along an optical axis Z from an object side toward an image side.

The first lens group G1 includes a negative first lens L1, a negative second lens L2, and a positive third lens L3 which are sequentially arranged from the object side toward the image side. The first lens L1 is a meniscus lens with a convex surface S1 facing the object side and a concave surface S2 facing the image side. The second lens L2 is a biconcave lens. The third lens L3 is a meniscus lens with a convex surface S5 facing the object side and a concave surface 6 facing the image side.

The second lens group G2 includes a positive fourth lens L4, a negative fifth lens L5, a negative sixth lens L6, and a positive seventh lens L7 which are sequentially arranged from the object side toward the image side. The fourth lens L4 is a biconvex lens, wherein two surfaces S8, S9 thereof are both aspheric. The fifth lens L5 is formed by adhering a positive lens L51 and a negative lens L52, wherein the lens L51 is closer to the object side than the lens L52. In the first preferred embodiment, the lens L51 is a meniscus lens with a convex surface S10 facing the object side and a concave surface S11 facing the image side. The lens L52 is also a meniscus lens with a convex surface S11 facing the object side and a concave surface S12 facing the image side. In other words, the surface S10 of the fifth lens L5 which is closest to the object side is convex, and the surface S12 which is closest to the image side is concave. The sixth lens L6 is a meniscus lens with a convex surface S13 facing the object side and a concave surface S14 facing the image side. The seventh lens L7 is a biconvex lens, wherein two surfaces S15, S16 thereof are both aspheric.

Whereby, the zoom lens 1 can be switched from a wide mode (as shown in FIG. 1) to a telephoto mode (as shown in FIG. 2) by moving the second lens group G2, which is located between the aperture ST and the image side, from the image side toward the object side along the optical axis Z. Also, when the zoom lens 1 is focusing, the first lens group G1 is moved relative to the aperture ST along the optical axis Z.

In the first preferred embodiment, besides the aforementioned structures of the lens groups G1, G2, the zoom lens 1 further satisfies the following conditions:

$$Vd4 > 70; \quad (1)$$

$$(C11+C12)/(C11-C12) < 1; \quad (2)$$

$$65 > Vd7 > 45, \quad (3)$$

where C11 is a curvature of the surface S11, C12 is curvature of the surface S12, Vd4 is an Abbe number of the fourth lens L4, and Vd7 is an Abbe number of the seventh lens L7.

In the first preferred embodiment, C11 is 0.02435332094633, and C12 is 0.12575206403917. Therefore, (C11+C12)/(C11−C12) is −1.4803475901872.

Whereby, with the aforementioned design, light is first diverged by the first lens group G1, and then passes through the aspheric fourth lens L4 of the second lens group G2. In this way, aberrations such as spherical aberration, coma aberration, and astigmatism can be effectively eliminated. In addition, with the positive fourth lens L4 and the positive lens L51, the light can be constrained to a height closer to the optical axis Z, which also effectively reduces the problems of aberrations. More specifically, the condition (1) listed above contributes to eliminate chromatic aberration of the light that happens after passing through the first lens group G1. Moreover, chromatic aberration can be eliminated by arranging the fifth lens L5 (i.e., the adhered lens formed by the lenses L51, L52) behind the fourth lens L4.

In addition, the negative lens L52 which satisfies the condition (2) listed above is able to effectively suppress all kinds of aberrations during the process of zooming. In other words, if the condition (2) is not satisfied, a curvature of an adhered surface 11 of the fifth lens L5 between the positive lens L51 and the negative lens L52 would be over bending, which increases the sensitivity of assembly and the difficulties of manufacturing, and it becomes more difficult to suppress lateral chromatic aberration.

Furthermore, the seventh lens L7 which satisfies the condition (3) is able to effectively reduce lateral chromatic aberration. On the contrary, if the Abbe number of the seventh lens L7 exceeds the upper or lower bound of the condition (3), the zoom lens 1 would have poorer performance on lateral chromatic aberration.

Table 1 shows radiuses R of curvatures of each lens surface where the optical axis Z passes through, distances D between each surface and the next surface (or image plain) on the optical axis Z, refractive indexes Nd of each lens, and Abbe numbers Vd of each lens. With such design, optical performance of the zoom lens 1 is significantly increased.

TABLE 1

| Surface | R (mm) | D (mm) | Nd | Vd | Remark |
|---|---|---|---|---|---|
| S1 | 24.7127 | 0.87384 | 1.740999 | 52.6365 | First Lens L1 |
| S2 | 7.0844 | 4.94307 | | | |
| S3 | −34.6623 | 0.71000 | 1.740999 | 52.6365 | Second Lens L2 |
| S4 | 9.6216 | 1.08500 | | | |
| S5 | 11.3517 | 2.48716 | 1.808095 | 22.7608 | Third Lens L3 |
| S6 | 44.6049 | D6 | | | |
| S7 | ∞ | D7 | | | Aperture ST |
| S8 | 6.9504 | 3.98523 | 1.496999 | 81.54 | Fourth Lens L4 |
| S9 | −14.9686 | 0.11000 | | | |
| S10 | 11.7008 | 1.75555 | 1.729157 | 54.68 | Fifth Lens L5 |
| S11 | 41.0622 | 0.71000 | 1.846660 | 23.7779 | (Lens L51 and Lens L52) |
| S12 | 7.9522 | 1.08423 | | | |
| S13 | 11.7204 | 1.91508 | 1.903664 | 31.3183 | Sixth Lens L6 |
| S14 | 7.6823 | 0.96566 | | | |
| S15 | 10.0989 | 2.35275 | 1.669550 | 55.4 | Seventh Lens L7 |
| S16 | −39.4596 | D16 | | | |
| S17 | ∞ | | | | Image Plain |

In addition to the aforementioned arguments, Table 2 shows effective focal lengths EFL, relative apertures Fno, field angles FOV, and distances D6, D7, D16 when the zoom lens 1 of the first preferred embodiment is in the wide mode and the telephoto mode.

TABLE 2

| | EFL | Fno | FOV | D6 | D7 | D16 |
|---|---|---|---|---|---|---|
| wide mode | 3.12 | 1.46 | 130.15 | 10.85 | 7.62492 | 5.3 |
| telephoto mode | 8.96 | 2.68 | 42.85 | 1.70997 | 0.75700 | 12.16701 |

Among the lenses in the first preferred embodiment, surface concavities z of the aspheric surfaces S8, S9, S15, S16 is defined by the following formula:

$$z = \frac{ch^2}{1 + \sqrt{1 - (1+k)c^2h^2}} + \alpha_2 h^4 + \alpha_3 h^6 + \alpha_4 h^8 + \alpha_5 h^{10},$$

where z is the surface concavity, c is reciprocal of radius of curvature, h is half the off-axis height of surface, k is conic constant, and $\alpha_2$-$\alpha_5$ each is different order coefficient of h.

Aspheric coefficient K and each of the order coefficients $\alpha_2$-$\alpha_5$ of each aspheric surface of the first preferred embodiment is listed in Table 3.

TABLE 3

| | Surface | | | |
|---|---|---|---|---|
| | S8 | S9 | S15 | S16 |
| K | 0 | 0 | 0 | 0 |
| $\alpha_2$ | −.264394E−03 | 0.459607E−03 | −.495779E−04 | 0.167274E−03 |
| $\alpha_3$ | −.300424E−05 | −.283414E−05 | −.354637E−04 | −.240486E−04 |
| $\alpha_4$ | 0.153817E−06 | 0.139784E−06 | −.130151E−05 | −.241311E−05 |
| $\alpha_5$ | −.974013E−08 | −.799712E−08 | −.154358E−06 | 0.135554E−08 |

Figure 3A:
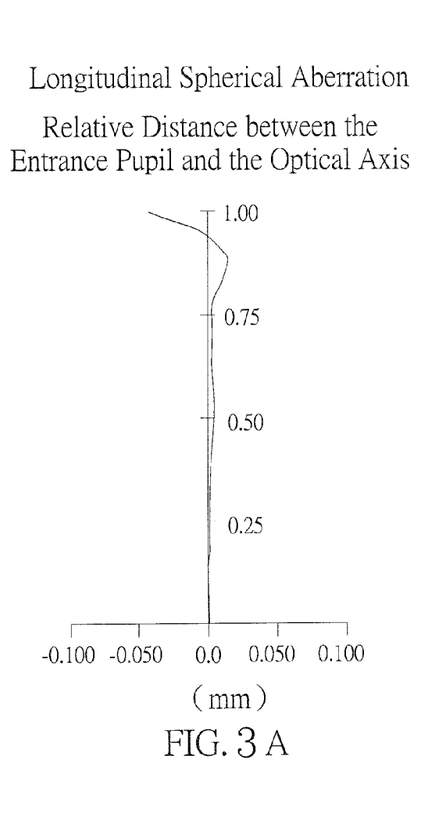
FIG. 3A is a longitudinal spherical aberration diagram of the zoom lens of the first preferred embodiment of the present invention in wide mode under 587 nm light.
Figure 3B:
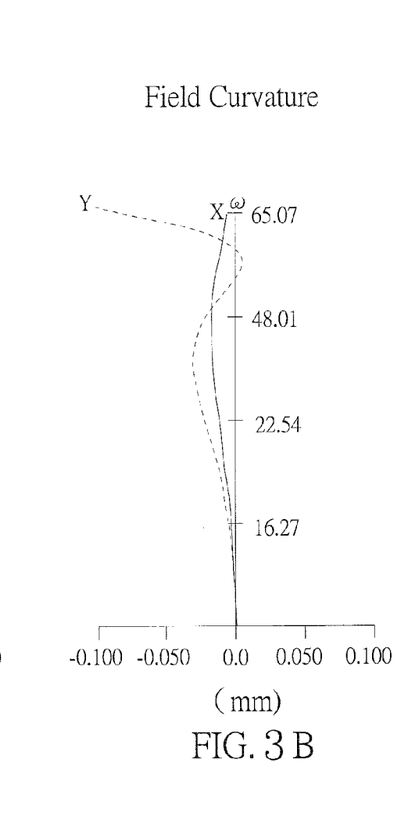
FIG. 3B is a field curvature diagram of the zoom lens of the first preferred embodiment of the present invention in wide mode under 587 nm light.
Figure 3C:
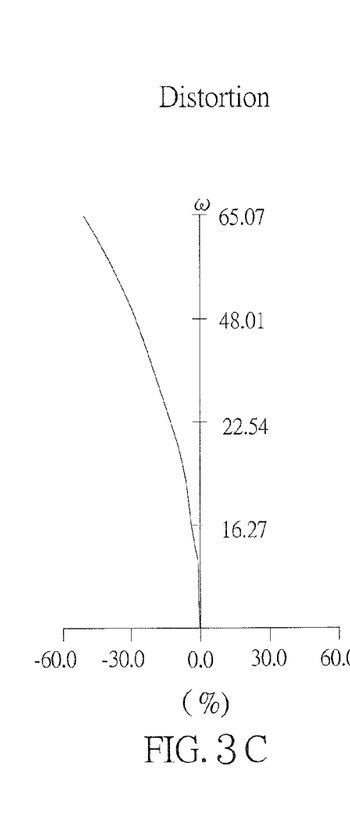
FIG. 3C is a distortion diagram light of the zoom lens of the first preferred embodiment of the present invention in wide mode under 587 nm.

With the arrangement of the aforementioned lens groups G1, G2 and the aperture ST, image quality of the zoom lens 1 of the first preferred embodiment meets demand when it is in the wide mode, which can be seen in FIG. 3A to FIG. 3C. As shown in FIG. 3A, when the zoom lens 1 of the first preferred embodiment is in the wide mode, its longitudinal spherical aberration doesn't exceed a range between −0.050 mm and 0.050 mm. As shown in FIG. 3B, when the zoom lens 1 of the first preferred embodiment is in the wide mode, its maximum field curvature doesn't exceed a range between −0.050 mm and 0.1 mm. As shown in FIG. 3C, when the zoom lens 1 of the first preferred embodiment is in the wide mode, its maximum distortion doesn't exceed a range between −60% and 30%.

Figure 4A:
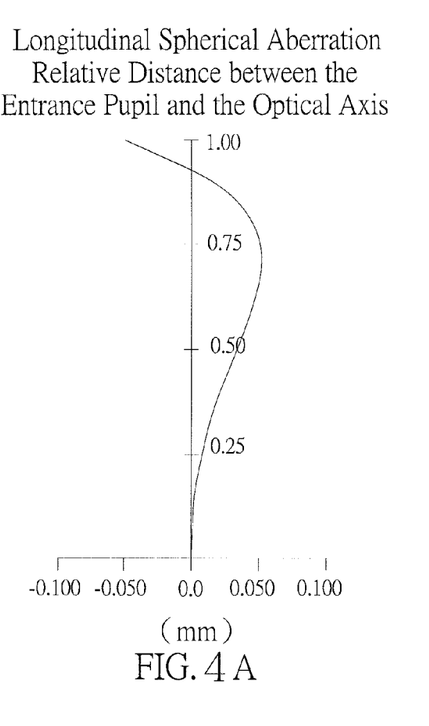
FIG. 4A is a longitudinal spherical aberration diagram of the zoom lens of the first preferred embodiment of the present invention in telephoto mode under 587 nm light.
Figure 4B:
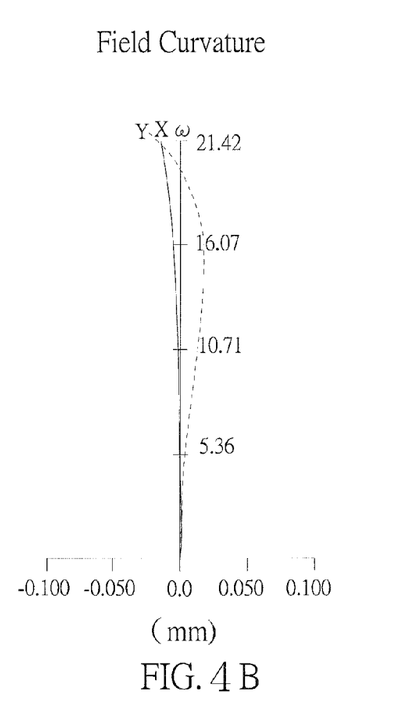
FIG. 4B is a field curvature diagram of the zoom lens of the first preferred embodiment of the present invention in telephoto mode under 587 nm light.
Figure 4C:
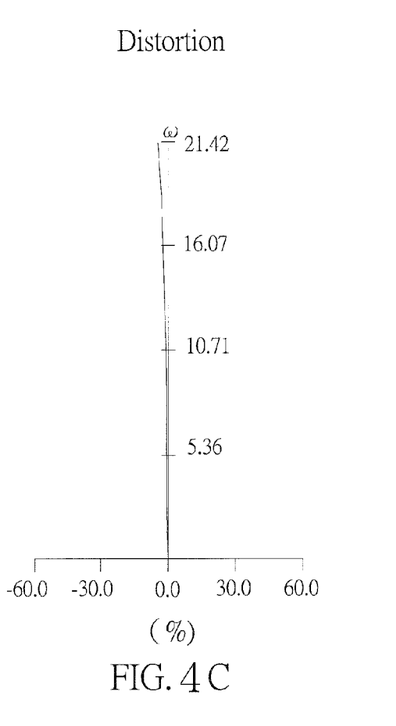
FIG. 4C is a distortion diagram of the zoom lens of the first preferred embodiment of the present invention in telephoto mode under 587 nm light.

In addition, image quality of the zoom lens 1 of the first preferred embodiment meets demand when it is in the telephoto mode, which can be seen in FIG. 4A to FIG. 4C. As shown in FIG. 4A, when the zoom lens 1 of the first preferred embodiment is in the telephoto mode, its longitudinal spherical aberration doesn't exceed a range between −0.050 mm and 0.050 mm. As shown in FIG. 4B, when the zoom lens 1 of the first preferred embodiment is in the telephoto mode, its maximum field curvature doesn't exceed a range between −0.050 mm and 0.050 mm. As shown in FIG. 4C, when the zoom lens 1 of the first preferred embodiment is in the telephoto mode, its maximum distortion doesn't exceed a range between −30% and 30%. It is obvious that the zoom lens 1 of the first preferred embodiment has high optical performance, and therefor is suitable for being applied in video recording devices such as surveillance devices or CCTVs.

Figure 5:
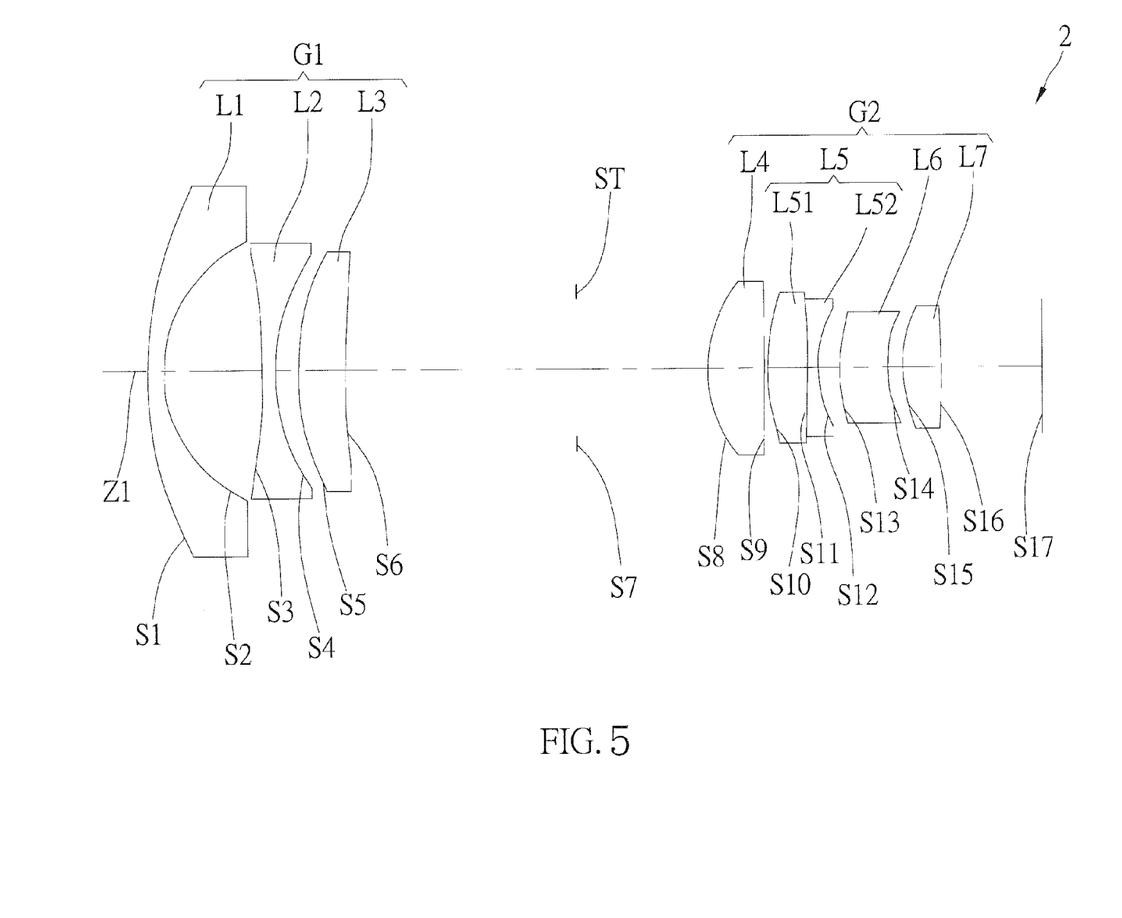
FIG. 5 is a schematic diagram of a second preferred embodiment of the present invention, showing the arrangement of the lenses in wide mode.
Figure 6:
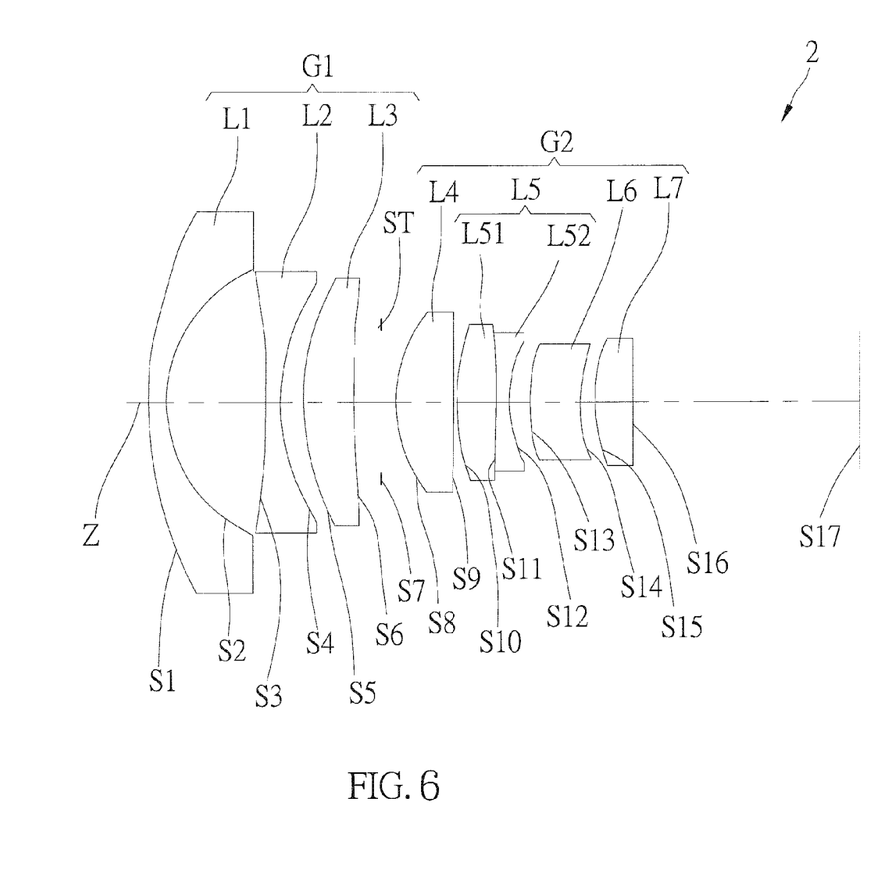
FIG. 6 is a schematic diagram of the second preferred embodiment of the present invention, showing the arrangement of the lenses in telephoto mode.

As shown in FIG. 5 and FIG. 6, a zoom lens 2 of the second preferred embodiment of the present invention also includes a negative first lens group G1, an aperture ST, and a positive second lens group G2 which are sequentially arranged from an object side toward an image side along an optical axis Z.

The first lens group G1 includes a negative first lens L1, a negative second lens L2, and a positive third lens L3 which are sequentially arranged from the object side toward the image side. The first lens L1 is a meniscus lens with a convex surface S1 facing the object side, and a concave surface S2 facing the image side. The second lens L2 is a biconcave lens. The third lens L3 is a meniscus lens with a convex surface S5 facing the object side and a concave surface S6 facing the image side.

The second lens group G2 includes a positive fourth lens L4, a negative fifth lens L5, a negative sixth lens L6, and a positive seventh lens L7 which are sequentially arranged from the object side toward the image side. The fourth lens L4 is a biconvex lens, wherein two surfaces S8, S9 thereof are both aspheric. The fifth lens L5 is formed by adhering a positive lens L51 and a negative lens L52, wherein the lens L51 is closer to the object side than the lens L52. In the second preferred embodiment, the lens L51 is a biconvex lens, and the lens L52 is a biconcave lens. In other words, a surface S10 of the fifth lens L5 which is closest to the object side is convex, and a surface S12 thereof which is closest to the image side is concave. The sixth lens L6 is a meniscus lens with a convex surface S13 facing the object side and a concave surface S14 facing the image side. The seventh lens L7 is a biconvex lens, wherein two surfaces S15, S16 thereof are both aspheric.

Whereby, the zoom lens 2 can be switched from a wide mode (as shown in FIG. 5) toward a telephoto mode (as shown in FIG. 6) by moving the second lens group G2, which is located between the aperture ST and the image side, from the image side toward the object side along the optical axis Z. Also, when the zoom lens 2 is focusing, the first lens group G1 is moved relative to the aperture ST along the optical axis Z.

In the second preferred embodiment, besides the aforementioned structures of the lens groups G1, G2, the zoom lens 2 further satisfies the following conditions:

$$(C11+C12)/(C11-C12)<1; \quad (1)$$

$$65>Vd7>45, \quad (2)$$

where C11 is a curvature of the surface S11, C12 is curvature of the surface S12, and Vd7 is an Abbe number of the seventh lens L7.

In the first preferred embodiment, C11 is −0.0113817668766, and C12 is 0.13994121131795. Therefore, (C11+C12)/(C11−C12) is −0.8495698801021.

Whereby, with the aforementioned design, light is first diverged by the first lens group G1, and then passes through the aspheric fourth lens L4 of the second lens group G2. In this way, aberrations such as spherical aberration, coma aberration, and astigmatism can be effectively eliminated. In addition, with the positive fourth lens L4 and the positive lens L51, the light can be constrained to a height closer to the optical axis Z, which also effectively reduces the problems of aberrations. Moreover, chromatic aberration can be even eliminated with the design that the fourth lens L4 is followed by the fifth lens L5 (i.e. the adhered lens formed by the lenses L51, L52).

The negative lens L52 which satisfies the condition (1) listed above is able to effectively suppress all kinds of aberrations during the process of zooming. In other words, if the condition (1) is not satisfied, a curvature of an adhered surface S11 of the fifth lens L5 between the positive lens L51 and the negative lens L52 would be over bending, which increases the sensitivity of assembly and the difficulties of manufacturing, and it becomes more difficult to suppress lateral chromatic aberration.

Furthermore, the seventh lens L7 which satisfies the condition (2) is able to effectively reduce lateral chromatic aberration. On the contrary, if the Abbe number of the seventh lens L7 exceeds the upper or lower bound of the condition (2), the zoom lens 2 would have poorer performance on lateral chromatic aberration.

Table 4 shows radiuses R of curvatures of each lens surface where the optical axis Z passes through, distances D between each surface and the next surface (or image plain) on the optical axis Z, refractive indexes Nd of each lens, and Abbe numbers Vd of each lens. With such design, optical performance of the zoom lens 2 is significantly increased.

TABLE 4

| Surface | R (mm) | D (mm) | Nd | Vd | Remark |
| --- | --- | --- | --- | --- | --- |
| S1 | 20.2789 | 0.8948 | 1.834000 | 37.16 | First Lens L1 |
| S2 | 7.3634 | 5.0658 | | | |
| S3 | −40.7674 | 0.7300 | 1.834807 | 42.71 | Second Lens L2 |
| S4 | 10.8475 | 1.1784 | | | |
| S5 | 13.1486 | 2.4915 | 1.922860 | 18.90 | Third Lens L3 |
| S6 | 60.6607 | D6 | | | |
| S7 | ∞ | D7 | | | Aperture ST |
| S8 | 7.6496 | 2.9691 | 1.669550 | 55.40 | Fourth Lens L4 |
| S9 | −32.2392 | 0.1300 | | | |
| S10 | 12.7048 | 1.9299 | 1.729157 | 54.68 | Fifth Lens L5 |
| S11 | −87.8598 | 0.7300 | 1.846660 | 23.78 | (Lens L51 and Lens L52) |
| S12 | 7.1459 | 1.1454 | | | |
| S13 | 11.5636 | 2.4496 | 1.846660 | 23.78 | Sixth Lens L6 |
| S14 | 7.6725 | 0.8024 | | | |
| S15 | 8.3417 | 1.9246 | 1.669550 | 55.40 | Seventh Lens L7 |
| S16 | −38.3043 | D16 | | | |
| S17 | ∞ | | | | Image Plain |

In addition to the aforementioned arguments, Table 5 shows effective focal lengths EFL, relative apertures Fno, field angles FOV, and distances D6, D7, D16 when the zoom lens 2 of the second preferred embodiment is in the wide mode and the telephoto mode.

TABLE 5

|  | EFL | Fno | FOV | D6 | D7 | D16 |
|---|---|---|---|---|---|---|
| wide mode | 3.15 | 1.45 | 127.02 | 11.9920 | 7.0148 | 5.3 |
| telephoto mode | 8.95 | 2.47 | 42.28 | 1.4038 | 0.7570 | 11.5584 |

Among the lenses in the second preferred embodiment, surface concavities z of the aspheric surfaces S8, S9, S15, S16 is defined by the following formula:

$$z = \frac{ch^2}{1+\sqrt{1-(1+k)c^2h^2}} + \alpha_2 h^4 + \alpha_3 h^6 + \alpha_4 h^8 + \alpha_5 h^{10},$$

where z is the surface concavity, c is reciprocal of radius of curvature, h is half the off-axis height of surface, k is conic constant, and $\alpha_2$-$\alpha_5$ each is different order coefficient of h.

Aspheric coefficient K and each of the order coefficients $\alpha_2$-$\alpha_5$ of each aspheric surface of the first preferred embodiment is listed in Table 6

TABLE 6

|  | Surface | | | |
|---|---|---|---|---|
|  | S8 | S9 | S15 | S16 |
| K | 0 | 0 | 0 | 0 |
| $\alpha_2$ | 0.844888E−04 | 0.521542E−03 | 0.298375E−03 | 0.782187E−03 |
| $\alpha_3$ | 0.351352E−05 | 0.170928E−05 | −.118928E−05 | −.512830E−05 |
| $\alpha_4$ | −.417999E−07 | 0.123260E−06 | −.276629E−05 | −.120234E−05 |
| $\alpha_5$ | 0.166529E−08 | −.153448E−08 | −.375276E−07 | −.922812E−07 |

Figure 7A:
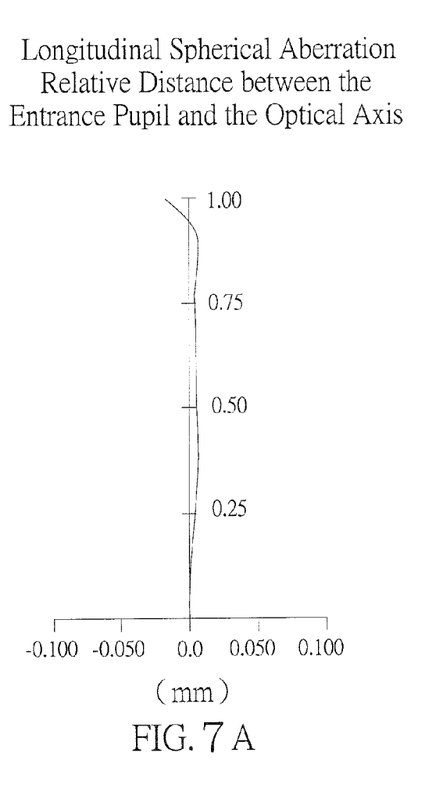
FIG. 7A is a longitudinal spherical aberration diagram of the zoom lens of the second preferred embodiment of the present invention in wide mode under 587 nm light.
Figure 7B:
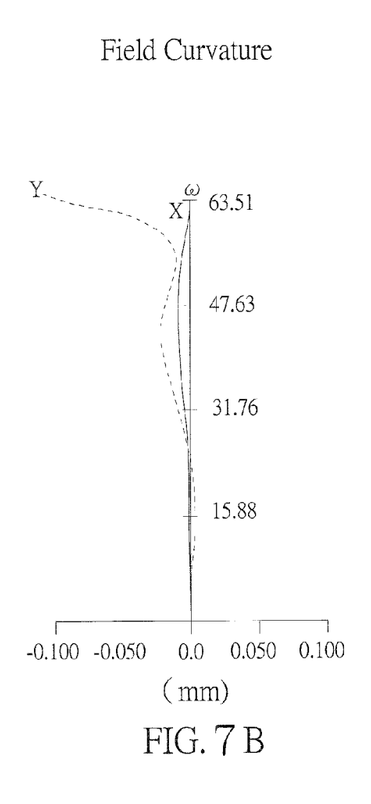
FIG. 7B is a field curvature diagram of the zoom lens of the second preferred embodiment of the present invention in wide mode under 587 nm light.
Figure 7C:
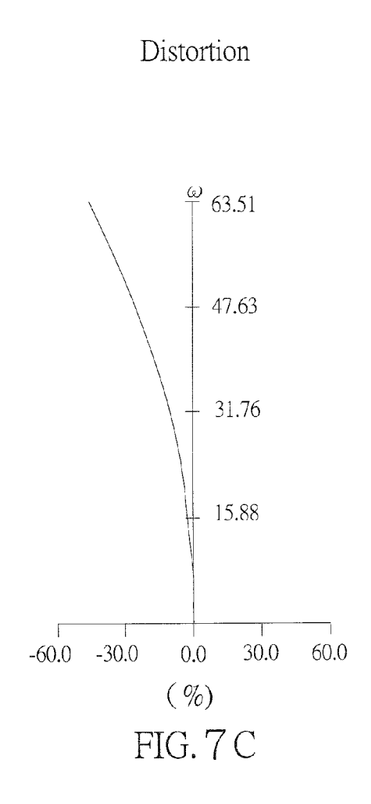
FIG. 7C is a distortion diagram of the zoom lens of the second preferred embodiment of the present invention in wide modem under 587 nm light.

With the arrangement of the aforementioned lens groups G1, G2 and the aperture ST, image quality of the zoom lens 2 of the second preferred embodiment meets demand when it is in the wide mode, which can be seen in FIG. 7A to FIG. 7C. As shown in FIG. 7A, when the zoom lens 2 of the second preferred embodiment is in the wide mode, its longitudinal spherical aberration doesn't exceed a range between −0.050 mm and 0.050 mm. As shown in FIG. 7B, when the zoom lens 2 of the second preferred embodiment is in the wide mode, its maximum field curvature doesn't exceed a range between −0.10 mm and 0.05 mm. As shown in FIG. 7C, when the zoom lens 2 of the second preferred embodiment is in the wide mode, its maximum distortion doesn't exceed a range between −60% and 30%.

Figure 8A:
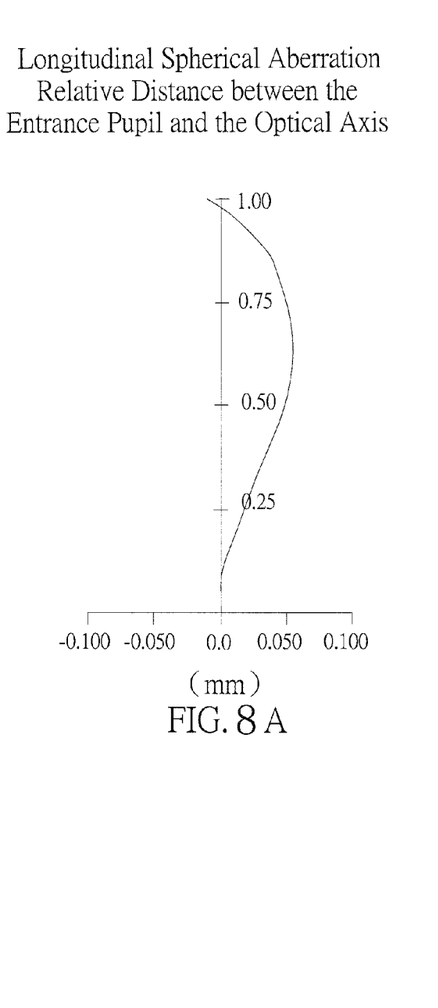
FIG. 8A is a longitudinal spherical aberration diagram of the zoom lens of the second preferred embodiment of the present invention in telephoto mode under 587 nm light.
Figure 8B:
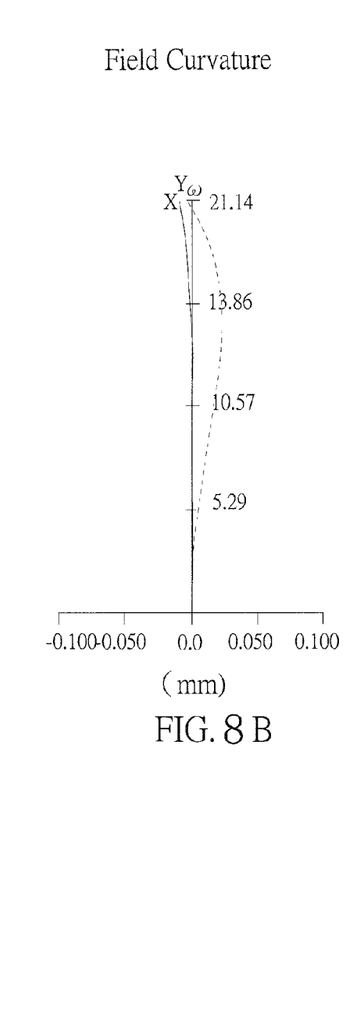
FIG. 8B is a field curvature diagram of the zoom lens of the second preferred embodiment of the present invention in telephoto mode under 587 nm light.
Figure 8C:
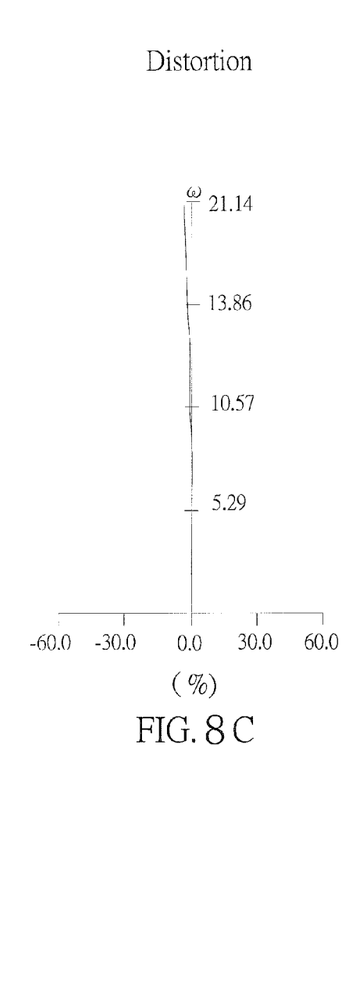
FIG. 8C is a distortion diagram of the zoom lens of the second preferred embodiment of the present invention in telephoto mode under 587 nm light.

In addition, image quality of the zoom lens 2 of the second preferred embodiment meets demand when it is in the telephoto mode, which can be seen in FIG. 8A to FIG. 8C. As shown in FIG. 8A, when the zoom lens 2 of the second preferred embodiment is in the telephoto mode, its longitudinal spherical aberration doesn't exceed a range between −0.050 mm and 0.100 mm. As shown in FIG. 8B, when the zoom lens 2 of the second preferred embodiment is in the telephoto mode, its maximum field curvature doesn't exceed a range between −0.050 mm and 0.050 mm. As shown in FIG. 8C, when the zoom lens 2 of the second preferred embodiment is in the telephoto mode, its maximum distortion doesn't exceed a range between −30% and 30%. It is obvious that the zoom lens 2 of the second preferred embodiment has high optical performance, and therefor is suitable for being applied in video recording devices such as surveillance devices or CCTVs.

It must be pointed out that the embodiments described above are only some preferred embodiments of the present invention. All equivalent structures which employ the concepts disclosed in this specification and the appended claims should fall within the scope of the present invention.

What is claimed is:

1. A zoom lens, along an optical axis from an object side to an image side, comprising:
   a negative first lens group including a negative first lens, a negative second lens, and a positive third lens which are sequentially arranged from the object side toward the image side;
   an aperture;
   a positive second lens group including a positive fourth lens, a negative fifth lens, a negative sixth lens, and a positive seventh lens which are sequentially arranged from the object side toward the image side, wherein the fifth lens is formed by adhering a positive lens and a negative lens, and the positive lens is closer to the object side than the negative lens; the sixth lens is a meniscus lens with a convex surface facing the object side and a concave surface facing the image side;
   the zoom lens is switched to a telephoto mode from a wide mode by moving the second lens group, which is located between the aperture and the image side, from the image side toward the object side; when the zoom lens is focusing, the first lens group is moved along the optical axis relative to the aperture; and
   the third lens is a meniscus lens, and the negative fifth lens has a concave surface facing the image side.

2. The zoom lens of claim 1, wherein the first lens is a meniscus lens with a convex surface facing the object side and a concave surface facing the image side; the second lens is a biconcave lens; the third lens has a convex surface facing the object side and a concave surface facing the image side.

3. The zoom lens of claim 1, wherein the fourth lens is a biconvex lens, and the seventh lens is a biconvex lens.

4. The zoom lens of claim 1, wherein at least one surface of the fourth lens is aspheric.

5. The zoom lens of claim 1, wherein at least one surface of the seventh lens is aspheric.

6. The zoom lens of claim 1, wherein a surface of the fifth lens which is closest to the object side is convex.

7. The zoom lens of claim 6, wherein the positive lens of the fifth lens is a meniscus lens, and the negative lens thereof is a meniscus lens.

8. The zoom lens of claim 6, wherein the positive lens of the fifth lens is a biconvex lens, and the negative lens thereof is a biconcave lens.

9. The zoom lens of claim 1, wherein the fifth lens further satisfies:

$(C11+C12)/(C11-C12)<1,$ where C11 is a curvature of a surface of the negative lens which faces the object side, and C12 is a curvature of a surface of the negative lens which faces the image side.

10. The zoom lens of claim 1, wherein the fourth lens further satisfies:

$Vd4>70,$ where Vd4 is an Abbe number of the fourth lens.

11. The zoom lens of claim 1, wherein the seventh lens further satisfies:

$65>Vd7>45,$ where Vd7 is an Abbe number of the seventh lens.

* * * * *